May 5, 1925.
R. A. CHADWICK, JR
TRACTOR ATTACHMENT
Filed Oct. 9, 1923
1,536,561
2 Sheets-Sheet 2
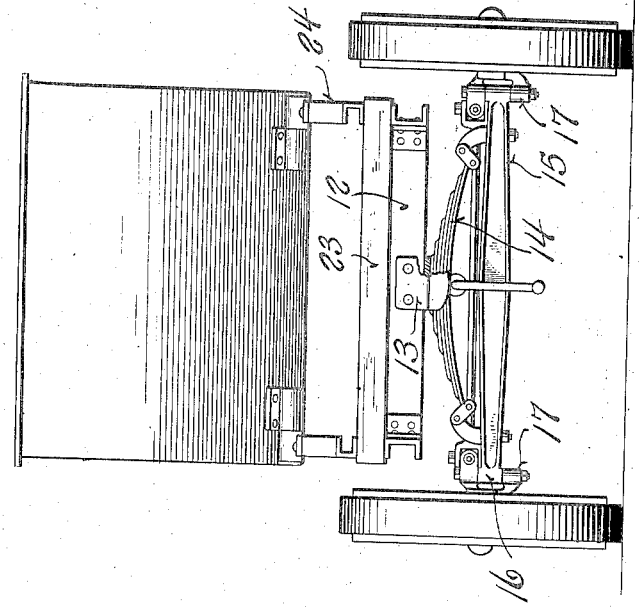
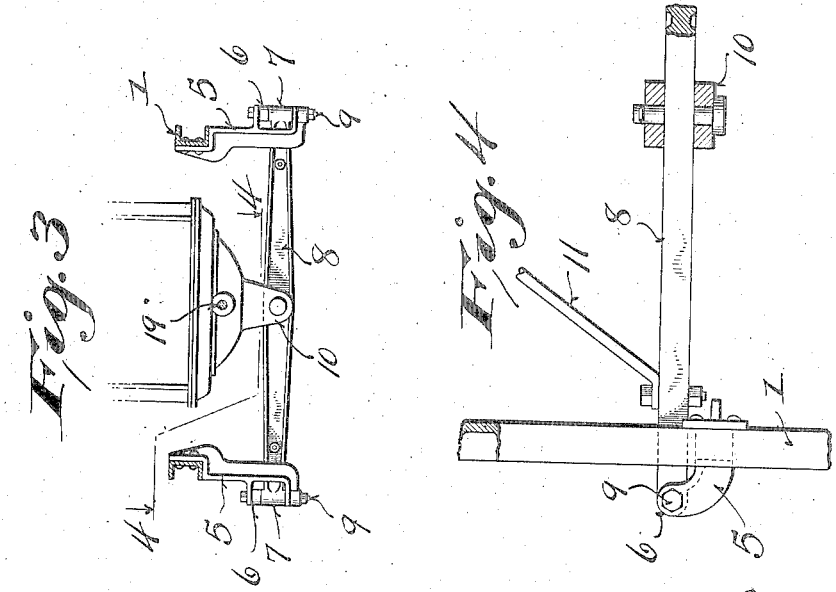
Inventor:
Robert A. Chadwick Jr.

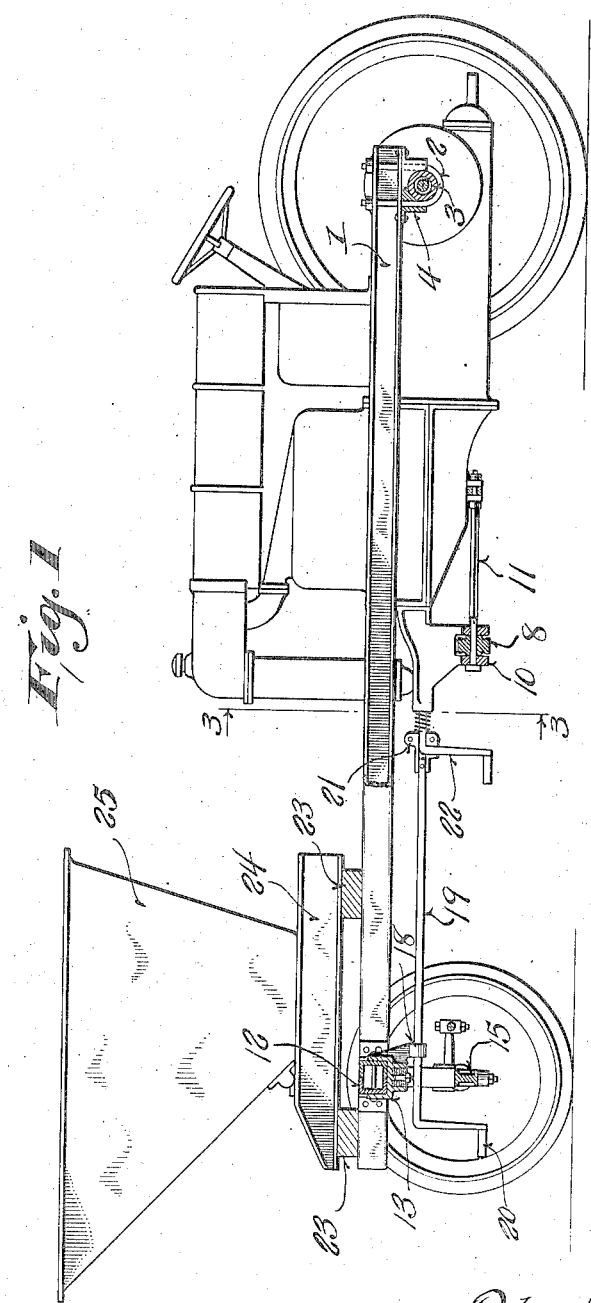

Patented May 5, 1925.

1,536,561

UNITED STATES PATENT OFFICE.

ROBERT A. CHADWICK, JR., OF MILWAUKEE, WISCONSIN.

TRACTOR ATTACHMENT.

Application filed October 9, 1923. Serial No. 667,472.

*To all whom it may concern:*

Be it known that I, ROBERT A. CHADWICK, Jr., a citizen of the United States, and resident of Milwaukee, in the county of Milwaukee and State of Wisconsin, have invented certain new and useful Improvements in Tractor Attachments; and I do hereby declare that the following is a full, clear, and exact description thereof.

This invention relates to tractor attachments.

Objects of this invention are to provide an attachment for a tractor which may be readily applied to existing types of tractors with a minimum of effort, which is adapted to receive the regular front axle of the tractor, which may be applied without removing the wishbone and which will take the strain off the supporting front ears of the tractor.

Further objects are to provide an attachment for a tractor in which the device may be clamped and bolted directly in place upon the tractor without disturbing the front axle construction of such tractor, in which the front wheels of the tractor may be placed upon the front axle of the attachment, in which provision is made for cranking the tractors from the front of the attachment, and to provide a construction which may be shipped in a knock-down condition, and which may be most readily re-assembled.

Although the attachment is adapted for a variety of uses, it, nevertheless, is eminently adapted for dump wagons in which a dumping hopper is carried at the front of the attachment and thus permits the device to be driven directly up to the place where dumping is taking place and does not necessitate backing the machine into position.

An embodiment of the invention is shown in the accompanying drawings, in which:—

Figure 1 is a side elevation of the attachment in position with parts broken away to more clearly show the construction.

Figure 2 is a front view of the device.

Figure 3 is a sectional view on the line 3—3 of Figure 1.

Figure 4 is a detail of the supporting parts for the front axle of the tractor, such view being a section on the line 4—4 of Figure 3.

The attachment comprises a pair of side channel bars 1 which, at their rear ends, are provided with U-bolts 2 adapted to pass around the rear axle 3 of the tractor and clamp such rear axle to a socketed casting 4 thus securely bolting the rear portion of the attachment in position. These side bars extend forwardly and are provided with brackets 5 which, as may seen from Figures 3 and 4, are bolted or riveted securely to the side frame bars. These brackets are provided with outwardly extending arms 6 which are adapted to receive between them the knuckle 7 of the tractor's front axle 8,—a suitable pintle bolt 9 being slipped into position. This front axle, it will be noted, is not disturbed but is left in position between the ears 10 of the tractor, and the wishbone 11 is similarly undisturbed. It is well known that it is a relatively difficult and tedious job to remove the wishbone from tractors and that frequently the services of a machinist are necessary for this purpose. This is wholly overcome by the construction outlined and it is again pointed out that by means of the peculiar arrangement described this tedious operation is wholly avoided. It is to be noted that the brackets 5 are rearwardly curved, as shown in Figure 4, so as to provide freedom for the front axle 8 without in any way causing binding of such front axle.

The side bars continue forwardly and have bolted thereto a transverse member formed of inwardly turned channel irons 12, see Figures 1 and 2. These channel irons carry a saddle 13 at their center which in turn holds the springs 14; such springs are joined in any suitable manner as by means of brackets and links, shown in Figure 2, to the front axle 15 of the attachment. This front axle is provided with knuckles 16 which are positioned between the arms 17 of the front wheel spindle and a suitable pintle bolt is slipped into position. If desired, the saddle 13 for the springs may be provided with a rearwardly and downwardly extending bearing 18 for an elongated crank rod 19, such rod being provided at its forward end with a manipulating crank 20. The rear end of this rod carries a two part member 21 which is adapted to clamp around the usual crank 22 of the tractor.

This construction permits the cranking of the tractor from the front end of the attachment and does not necessitate the cranking of the tractor at an inaccessible or difficultly accessible position. Further it does not necessitate any alteration whatsoever of the crank construction of the tractor.

At the forward portion of the side bars, a pair of spaced transverse beams 23 are secured. These beams carry longitudinally extending members 24 which support the dumping hopper 25 in any suitable and usual manner. This dumping hopper, it will be noted, may be of any accepted standard type.

It will be seen, therefore, that an attachment for a tractor has been provided which is adapted to receive the front axle of the tractor without any alteration in its construction and without removal of the wishbone. It will further be seen that means have been provided for cranking the tractor from the front end of the device without necessitating altering of the usual cranking mechanism of such tractor. It is to be particularly noted that the maximum strain is not imposed upon the ears 10 of the tractor (see Figure 3) but that such ears are called upon merely to support the front end of the tractor and are not called upon to transmit the tractive effort of the machine.

It will further be seen that the machine may be driven directly into position to dump without requiring any maneuvering such as backing, for instance, to properly position the dumping hopper.

Although one form of the invention has been described in considerable detail, it is to be understood that the invention may be variously embodied and is, therefore, to be limited only as claimed.

I claim:

1. The combination of a tractor having a front axle, a wishbone brace extending therefrom, said tractor having a rear axle housing and rear wheels, a pair of side bars positioned upon opposite sides of said tractor, means clamping the rear portion of said side bars to said rear axle housing, brackets extending from an intermediate portion of said side bars and receiving the knuckles of the front axle, a front axle carried by the front portion of said side bars, and wheels carried by the last mentioned front axle.

2. An attachment for a tractor comprising a pair of side bars, means for rigidly bolting said side bars to the rear axle housing of said tractor, downwardly extending brackets adapted to receive the knuckle of the front axle of said tractor such brackets being attached to said side bars intermediate their ends, a front axle carried by the front portion of said side bars and adapted to receive the front wheels of said tractor, a supporting structure carried by said side bars adjacent their front ends, and a dumping hopper carried by said supporting structure.

3. An attachment for a tractor comprising a pair of side bars, means for attaching the rear end of said bars to the rear axle housing of said tractor, brackets carried by said side bars and adapted to receive the front axle of said tractor, a front axle carried by said attachment and adapted to carry the front wheels of said tractor, a crank located at the front end of said attachment, a rearwardly extending shaft operatively connected with said crank, and means carried by the rear end of said shaft for engaging the crank of said tractor.

In testimony that I claim the foregoing I have hereunto set my hand at Milwaukee, in the county of Milwaukee and State of Wisconsin.

ROBERT A. CHADWICK, Jr.